United States Patent
Kondo et al.

(10) Patent No.: US 6,859,493 B2
(45) Date of Patent: *Feb. 22, 2005

(54) APPARATUS AND METHOD FOR THE RECOVERY OF COMPRESSION CONSTANTS IN THE ENCODED DOMAIN

(75) Inventors: Tetsujiro Kondo, Kanagawa-Prefecture (JP); James J. Carrig, San Jose, CA (US); Yasuhiro Fujimori, Cupertino, CA (US); Sugata Ghosal, New Delhi (IN)

(73) Assignees: Sony Corporation, Tokyo (JP); Sony Electronics Inc., Park Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 78 days.

(21) Appl. No.: 09/342,329

(22) Filed: Jun. 29, 1999

(65) Prior Publication Data

US 2003/0223490 A1 Dec. 4, 2003

Related U.S. Application Data

(63) Continuation-in-part of application No. 09/249,596, filed on Feb. 12, 1999.

(51) Int. Cl.[7] ................................................ H04B 1/66
(52) U.S. Cl. ...................... 375/240; 348/615; 348/617; 348/607; 375/240.25; 375/240.01; 375/240.17
(58) Field of Search ................... 375/240; 348/615–617, 348/607, 603

(56) References Cited

U.S. PATENT DOCUMENTS

| | | |
|---|---|---|
| 3,311,879 A | 3/1967 | Daher |
| 3,805,232 A | 4/1974 | Allen |
| 4,361,853 A | 11/1982 | Remy et al. |
| 4,381,519 A | 4/1983 | Wilkinson et al. ......... 358/21 R |
| 4,419,693 A | 12/1983 | Wilkinson ................. 358/167 |
| 4,509,150 A | 4/1985 | Davis |
| 4,532,628 A | 7/1985 | Matthews |
| 4,574,393 A | 3/1986 | Blackwell et al. |
| 4,586,082 A | 4/1986 | Wilkinson |
| 4,656,514 A | 4/1987 | Wilkinson et al. |
| 4,675,735 A | 6/1987 | Wilkinson et al. |

(List continued on next page.)

FOREIGN PATENT DOCUMENTS

| | | | |
|---|---|---|---|
| EP | 0 398 741 A | 11/1990 | |
| EP | 0 527 611 | 8/1992 | ............ H04N/9/80 |
| EP | 0 558 016 | 2/1993 | .......... H04N/7/133 |

(List continued on next page.)

OTHER PUBLICATIONS

International Search Report PCT/US00/03439, Feb. 9, 2000, 8 pgs.
International Search Report PCT/US00/03595, Feb. 10, 2000, 6 pgs.
International Search Report PCT/US00/03611, Feb. 10, 2000, 8 pgs.

(List continued on next page.)

*Primary Examiner*—Stephen Chin
*Assistant Examiner*—Guillermo Muñoz
(74) *Attorney, Agent, or Firm*—Blakely, Sokoloff, Taylor & Zafman LLP

(57) ABSTRACT

The system and method of the present invention provides an innovative technique and efficient hardware structure for recovering lost or damaged (lost/damaged) compression constants in the encoded domain. In one embodiment, a lost/damaged compression constant is recovered by estimating a compression constant of the block using encoded data of at least one neighboring block of data and other recoverable compression constants of the block.

46 Claims, 3 Drawing Sheets

U.S. PATENT DOCUMENTS

| | | | | |
|---|---|---|---|---|
| 4,703,351 | A | 10/1987 | Kondo | 358/135 |
| 4,703,352 | A | 10/1987 | Kondo | 358/135 |
| 4,710,811 | A | 12/1987 | Kondo | 358/135 |
| 4,722,003 | A | 1/1988 | Kondo | 358/135 |
| 4,729,021 | A | 3/1988 | Kondo | |
| 4,772,947 | A | 9/1988 | Kono | 358/135 |
| 4,788,589 | A | 11/1988 | Kondo | 358/133 |
| 4,807,033 | A | 2/1989 | Keesen et al. | |
| 4,815,078 | A | 3/1989 | Shimura | 370/30 |
| 4,845,560 | A | 7/1989 | Kondo et al. | 358/133 |
| 4,885,636 | A | 12/1989 | Sullivan | |
| 4,890,161 | A | 12/1989 | Kondo | 358/135 |
| 4,924,310 | A | 5/1990 | Von Brandt | 358/136 |
| 4,953,023 | A | 8/1990 | Kondo | 358/135 |
| 4,975,915 | A | 12/1990 | Sako et al. | |
| 5,023,710 | A | 6/1991 | Kondo et al. | 358/133 |
| 5,086,489 | A | 2/1992 | Shimura | |
| 5,093,872 | A | 3/1992 | Tutt | |
| 5,101,446 | A | 3/1992 | Resnikoff et al. | |
| 5,122,873 | A | 6/1992 | Golin | |
| 5,134,479 | A | 7/1992 | Ohishi | |
| 5,142,537 | A | 8/1992 | Kutner et al. | 371/31 |
| 5,150,210 | A | 9/1992 | Hoshi et al. | |
| 5,159,452 | A | 10/1992 | Kinoshita et al. | |
| 5,166,987 | A | 11/1992 | Kageyama | |
| 5,177,797 | A | 1/1993 | Takenaka et al. | |
| 5,185,746 | A | 2/1993 | Tanaka et al. | |
| 5,196,931 | A | 3/1993 | Kondo | 358/133 |
| 5,208,816 | A | 5/1993 | Seshardi et al. | 371/43 |
| 5,237,424 | A | 8/1993 | Nishino et al. | 358/310 |
| 5,241,381 | A | 8/1993 | Kondo | 358/133 |
| 5,243,428 | A | 9/1993 | Challapali et al. | |
| 5,247,363 | A | 9/1993 | Sun et al. | |
| 5,258,835 | A | 11/1993 | Kato | 358/135 |
| 5,307,175 | A | 4/1994 | Seachman | |
| 5,327,502 | A | 7/1994 | Katata et al. | 382/56 |
| 5,337,087 | A | 8/1994 | Mishima | |
| 5,359,694 | A | 10/1994 | Concordel | 358/445 |
| 5,379,072 | A | 1/1995 | Kondo | 348/441 |
| 5,398,078 | A | 3/1995 | Masuda et al. | 348/699 |
| 5,400,076 | A | 3/1995 | Iwamura | |
| 5,406,334 | A | 4/1995 | Kondo et al. | |
| 5,416,651 | A | 5/1995 | Uetake et al. | 360/48 |
| 5,416,847 | A | 5/1995 | Boze | |
| 5,428,403 | A | 6/1995 | Andrew et al. | 348/699 |
| 5,434,716 | A | 7/1995 | Sugiyama et al. | 360/32 |
| 5,438,369 | A | 8/1995 | Citta et al. | 348/470 |
| 5,446,456 | A | 8/1995 | Seo | |
| 5,455,629 | A | 10/1995 | Sun et al. | |
| 5,469,216 | A | 11/1995 | Takahashi et al. | 348/441 |
| 5,469,474 | A | 11/1995 | Kitabatake | |
| 5,471,501 | A | 11/1995 | Parr et al. | 375/354 |
| 5,473,479 | A | 12/1995 | Takakura | |
| 5,481,554 | A | 1/1996 | Kondo | 371/53 |
| 5,481,627 | A | 1/1996 | Kim | 382/254 |
| 5,495,298 | A | 2/1996 | Uchida et al. | |
| 5,499,057 | A | 3/1996 | Kondo et al. | |
| 5,552,608 | A | 9/1996 | Shimizume | 371/40.3 |
| 5,557,420 | A | 9/1996 | Yanagihara et al. | |
| 5,557,479 | A | 9/1996 | Yanagihara | |
| 5,577,053 | A | 11/1996 | Dent | |
| 5,594,807 | A | 1/1997 | Liu | |
| 5,598,214 | A | 1/1997 | Kondo et al. | 348/414 |
| 5,617,333 | A | 4/1997 | Oyamada et al. | |
| 5,625,715 | A | 4/1997 | Trew et al. | 382/236 |
| 5,636,316 | A | 6/1997 | Oku et al. | |
| 5,649,053 | A | 7/1997 | Kim | |
| 5,663,764 | A | 9/1997 | Kondo et al. | 348/414 |
| 5,673,357 | A | 9/1997 | Shima | |
| 5,677,734 | A | 10/1997 | Oikawa et al. | |
| 5,689,302 | A | 11/1997 | Jones | |
| 5,699,475 | A | 12/1997 | Oguro et al. | |
| 5,703,889 | A | 12/1997 | Shimoda et al. | 371/55 |
| 5,724,099 | A | 3/1998 | Hamdi et al. | |
| 5,724,369 | A | 3/1998 | Brailean et al. | |
| 5,737,022 | A | 4/1998 | Yamaguchi et al. | |
| 5,751,361 | A | 5/1998 | Kim | |
| 5,751,743 | A | 5/1998 | Takizawa | 371/41 |
| 5,751,862 | A | 5/1998 | Williams et al. | |
| 5,786,857 | A | 7/1998 | Yamaguchi | |
| 5,790,195 | A | 8/1998 | Ohsawa | |
| 5,796,786 | A | 8/1998 | Lee | 375/326 |
| 5,805,762 | A | 9/1998 | Boyce et al. | 386/68 |
| 5,809,041 | A | 9/1998 | Shikakura et al. | |
| 5,809,231 | A | 9/1998 | Yokoyama et al. | |
| 5,852,470 | A | 12/1998 | Kondo et al. | 348/448 |
| 5,861,922 | A | 1/1999 | Murashita et al. | |
| 5,878,183 | A | 3/1999 | Sugiyama et al. | |
| 5,896,466 | A | 4/1999 | Kim | |
| 5,903,481 | A | 5/1999 | Kondo et al. | |
| 5,933,571 | A | 8/1999 | Bannai et al. | |
| 5,936,674 | A | 8/1999 | Kim | |
| 5,938,318 | A | 8/1999 | Araki | |
| 5,946,044 | A | 8/1999 | Kondo et al. | |
| 6,067,636 | A | 5/2000 | Yao et al. | |
| 6,137,915 | A | 10/2000 | Chai | |
| 6,363,118 | B1 * | 3/2002 | Kondo et al. | 375/240.24 |

FOREIGN PATENT DOCUMENTS

| | | | | |
|---|---|---|---|---|
| EP | 0 566 412 A2 | 4/1993 | | |
| EP | 0 571 180 A2 | 5/1993 | | |
| EP | 0 592 196 A2 | 10/1993 | | |
| EP | 0 596 826 | 11/1993 | | H04N/5/92 |
| EP | 0 605 209 A2 | 12/1993 | | |
| EP | 0 610 587 | 12/1993 | | |
| EP | 0 597 576 A | 5/1994 | | |
| EP | 0 651 584 A2 | 10/1994 | | |
| EP | 0 680 209 | 4/1995 | | H04N/5/91 |
| EP | 0 746 157 A2 | 5/1996 | | |
| EP | 0 833 517 | 4/1998 | | H04N/7/30 |
| GB | 2 320 836 A | 11/1997 | | |
| JP | 7-67028 | 3/1995 | | H04N/5/235 |
| WO | WO96/07987 | 9/1995 | | |
| WO | WO99/21285 | 10/1998 | | |
| WO | 99 21090 A | 4/1999 | | |

OTHER PUBLICATIONS

International Search Report PCT/US00/03599, Feb. 10, 2000, 4 pgs.

International Search Report PCT/US00/03742, Feb. 11, 2000, 5 pgs.

International Search Report PCT/US00/03654, Feb. 10, 2000, 4 pgs.

International Search Report PCT/US00/03299, Feb. 9, 2000, 5 pgs.

Meguro, et al., "An Adaptive Order Statistics Filter Based On Fuzzy Rules For Image Processing", pp. 70–80, XP–00755627, 1997 Scripta Technica, Inc.

Japanese Patent No. 05304659 and translation of Abstract.
Japanese Patent No. 05244578 and translation of Abstract.
Japanese Patent No. 05300485 and translation of Abstract.
Japanese Patent No. 06070298 and translation of Abstract.
Japanese Patent No. 06006778 and translation of Abstract.
Japanese Patent No. 06113256 and translation of Abstract.
Japanese Patent No. 06113275 and translation of Abstract.
Japanese Patent No. 06253287 and translation of Abstract.
Japanese Patent No. 06253280 and translation of Abstract.
Japanese Patent No. 06253284 and translation of Abstract.

Japanese Patent No. 06350981 and translation of Abstract.
Japanese Patent No. 06350982 and translation of Abstract.
Japanese Patent No. 08317394 and translation of Abstract.
Japanese Patent No. 07023388 and translation of Abstract.
Japanese Patent No. 04245881 and translation of Abstract.
Japanese Patent No. 04115628 and translation of Abstract.
Japanese Patent No. 04115686 and translation of Abstract.
Translation of Abstract of Japanese Patent No. 61147690.
Translation of Abstract of Japanese Patent No. 63256080..
Translation of Abstract of Japanese Patent No. 63257390.
Translation of Abstract of Japanese Patent No. 02194785.
Translation of Abstract of Japanese Patent No. 03024885.
Translation of Abstract of Japanese Patent No. 04037293.
Translation of Abstract of Japanese Patent No. 04316293.
Translation of Abstract of Japanese Patent No. 04329088.
Translation of Abstract of Japanese Patent No. 05047116.
Translation of Abstract of Japanese Patent No. 05244579.
Translation of Abstract of Japanese Patent No. 05244580.
Translation of Abstract of Japanese Patent No. 05244559.
Translation of Abstract of Japanese Patent No. 05304659.
Translation of Abstract of Japanese Patent No. 06086259.
Translation of Abstract of Japanese Patent No. 06113258.
Translation of Abstract of Japanese Patent No. 06125534.
Translation of Abstract of Japanese Patent No. 06162693.
Translation of Abstract of Japanese Patent No. 06253287.
Translation of Abstract of Japanese Patent No. 06253280.
Translation of Abstract of Japanese Patent No. 06253284.
Translation of Abstract of Japanese Patent No. 07046604.
Translation of Abstract of Japanese Patent No. 07085611.
Translation of Abstract of Japanese Patent No. 07095581.
Translation of Abstract of Japanese Patent No. 07177505.
Translation of Abstract of Japanese Patent No. 07177506.
Translation of Abstract of Japanese Patent No. 07240903.
International Search Report PCT/US00/03738, Feb. 11, 2000, 9 pgs.
Stammnitz, et al., "*Digital HDTV Experimental System*", pp. 535–542.
International Search Report PCT/US00/03508, Feb. 9, 2000, 8 pgs.
Chu, et al., Detection and Concealment of Transmission Errors in H.261 Images, XP–000737027, pp. 74–84, IEEE transactions, Feb. 1998.
Park, et al., "Recovery of Block–coded Images from Channel Errors", p. 396–400, pub. Date May 23, 1993.
Jeng, et al., "*Concealment Of Bit Error And Cell Loss In Inter–Frame Coded Video Transmission*", 1991 IEEE, 17.4.1–17.4.5.

Monet, et al., "*Block Adaptive Quantization Of Images*", IEEE 1993, pp. 303–306.

International Search Report PCT/US00/03743, 4 pgs., Feb. 11, 2000.

International Search Report, PCT/US98/22412, Oct. 5, 1999, 5 pgs.

Kondo, et al., "Adaptive Dynamic Range Coding Scheme for Future HDTV Digital VTR", Fourth International Workshop on HDTV and Beyond, Sep. 4–6, Turin, Italy.

Kondo, et al., "A New Concealment Method for Digital VCR's", IEEE Visual Signal Processing and Communication, pp. 20–22, 9/93, Melbourne, Australia.

Park, et al., "A Simple Concealment for ATM Bursty Cell Loss", IEEE Transactions on Consumer Electronics, No. 3, Aug. 1993, pp. 704–709.

Tom, et al., "Packet Video for Cell Loss Protection Using Deinterleaving and Scrambling", ICASSP 91: 1991 International Conference on Acoustics, Speech and Signal Processing, vol. 4, pp. 2857–2860, Apr. 1991.

NHK Laboratories Note, "Error Correction, Concealment and Shuffling", No. 424, Mar. 1994, pp. 29–44.

Translation of Japanese Patent #7–67028, 30 pgs.

Kondo, et al., "Adaptive Dynamic Range Coding Scheme for Future Consumer Digital VTR", pp. 219–226.

Kim, et al., "Bit Rate Reduction Algorithm for a Digital VCR", IEEE Transactions on Consumer Electronics, vol. 37, No. 3, Aug. 1, 1992, pp. 267–274.

R.C. Gonzalez, et al., "Digital Image Processing", Addison Wesley Publishing Compant, Inc., 1992, pp. 346–348.

R. Aravind, et al., "Image and Video Coding Standards", AT&T Technical Journal, Jan./Feb. 1993, pp. 67–88.

Zhu, et al., "Coding and Cell–Loss Recovery in DCT–Based Packet Video", IEEE Transactions on Circuits and Systems for Video Technology, Jun. 3, 1993, No. 3, NY.

International Search Report, PCT/US98/22347, Mar. 16, 1999, 2 pgs.

International Search Report, PCT/US95/22531, Apr. 1, 1999, 1 pg.

International Search Report, PCT/US98/22411, Feb. 25, 1999, 1 pg.

\* cited by examiner

APPARATUS AND METHOD FOR THE RECOVERY OF COMPRESSION CONSTANTS IN THE ENCODED DOMAIN

RELATED APPLICATIONS

This application is a continuation-in-part of U.S. patent application Ser. No.: 09/249,596, filed Feb. 12, 1999, titled "Apparatus and Method for the Recovery of Compression Constants in the Encoded Domain".

BACKGROUND OF THE INVENTION

1. Field of the Invention

The present invention relates to the recovery of data. More particularly, the present invention relates to the recovery of lost/damaged block data in a bitstream of compressed data.

2. Art Background

It is often desirable to compress data, such as video images or sound data, for transmission and storage. Typically, when data is compressed, compression constants are generated. In some instances block-wide data is generated. These constants are transmitted or stored along with the compressed image. Problems can arise if the compression constants are lost or damaged prior to decompression of the data. As an illustration, the discussion below illustrates the problems that arise if image data compression constants are lost.

The discrete data points that make up a digital image are known as pixels. Typically, each pixel is represented independently using 8 bits, but other representations also are used for the purposes of compression or analysis. Most of the alternative representations begin by dividing this raw data into disjoint sets. For historical reasons, these sets are referred to as "blocks", even though they may not have a traditional block shape. The alternative representation then characterizes the data by some block-wide information and per-pixel information.

Examples of block-wide information include the minimum pixel value (MIN), the maximum pixel value (MAX), and the dynamic range of the pixel values (DR), where DR=MAX−MIN or DR=1+MAX−MIN. Per-pixel information may indicate where the pixel value lies within the range specified by the global information. For compression to be achieved, the per-pixel information must use only a few bits of storage so that the total number of bits used is less than that required to store the raw image.

In one example, the block data is comprised of the MIN, DR and Qbit number (defined below), and the pixel data is comprised of Q codes. A Q code is a Qbit number that can be an integer in the range $[0, 2^Q-1]$ that identifies one value in the set $\{MIN, MIN+1, \ldots, MAX\}$. Since the Qbit number is generally small and the DR value may be relatively large, it is generally not possible to represent all pixel values exactly. Therefore, some quantization error is introduced when pixel values are reduced to Q code values. For instance, if the Qbit number is 3, then it is generally possible to represent $2^3=8$ values from the set $\{MIN, MIN+1, \ldots, MAX\}$ without any error. Pixels with other values are rounded to one of these eight values. This rounding introduces quantization error.

If any of the block information, e.g., MIN, MAX or DR, is lost, the damage to the image is potentially large as many pixels are affected. For this reason, it is desirable to have techniques for accurately estimating or recovering the values of this lost data.

Recovery methods fall into two categories: decoded domain, and encoded domain. Decoded domain techniques restore portions of the image to its raw data format and then exploit local correlation properties to estimate the missing data. Data recovery, including compression constants, may be performed in the decoded domain. However, additional computation and time, and therefore additional expense, is required to perform and evaluate decodings.

SUMMARY OF THE INVENTION

The system and method of the present invention provides an innovative technique for recovering lost or damaged (lost/damaged) compression constants of a block in the encoded domain. In one embodiment, a lost/damaged compression constant is recovered by estimating a compression constant of the block using encoded data of at least one neighboring block of data and other recoverable compression constants of the block and neighboring block. For example, in one embodiment wherein the encoded data comprises image data, each block of data consists of dynamic range (DR) and Minimum (MIN) constants, where DR=MAX−MIN and MAX represents a maximum data value in the block.

BRIEF DESCRIPTION OF THE DRAWINGS

The objects, features and advantages of the present invention will be apparent from the following detailed description in which.

DETAILED DESCRIPTION

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

The following is described in the context of Adaptive Dynamic Range Coding (ADRC) encoded images, and more particularly to the recovery of lost or damaged (lost/damaged) compression constants such as dynamic range (DR) and Minimum value (MIN). However, it is contemplated that the present invention is not limited to ADRC encoding and the particular compression constants generated; rather it will be apparent that the present invention is applicable to different compression technologies, different types of data, including, but not limited to, sound data and the like, and different compression constants including, but not limited to, the Maximum value (MAX) which may be used in ADRC processes. In addition, the present invention is applicable to different types of ADRC processes including edge-matching and non edge-matching ADRC. For further information regarding ADRC, see, "Adaptive Dynamic Range Coding Scheme for Future HDTV Digital VTR", Kondo, Fujimori, Nakaya, Fourth International Workshop on HDTV and Beyond, Sep. 4–6, 1991, Turin, Italy.

Figure 1:
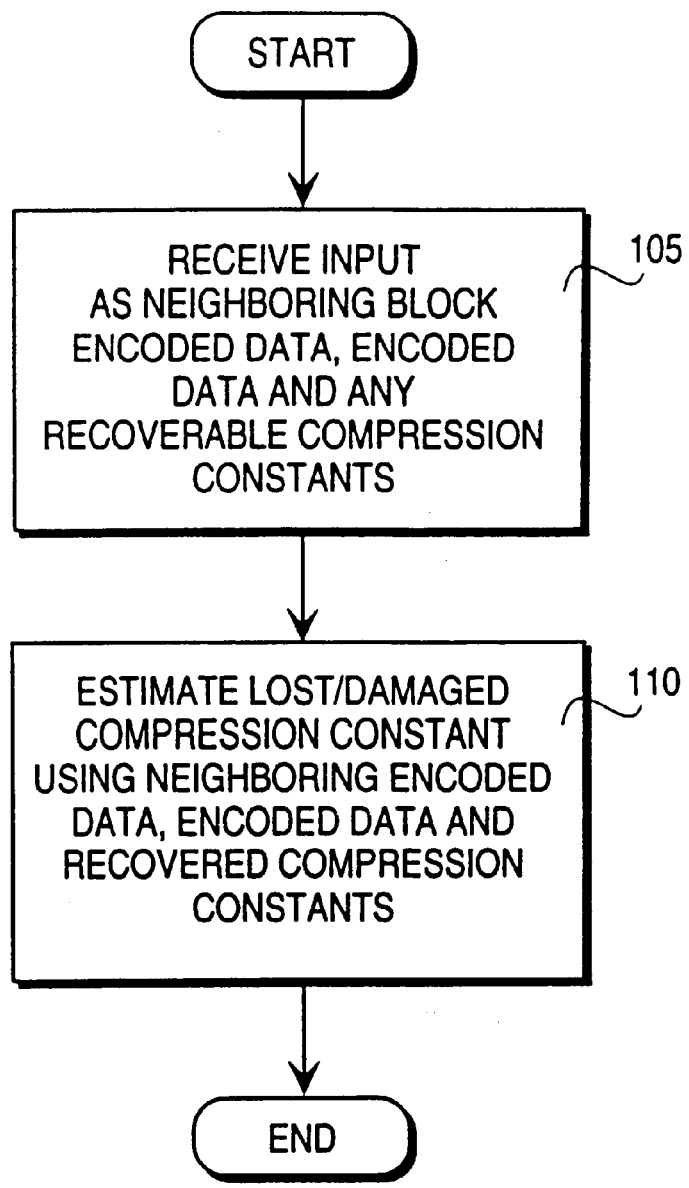
FIG. 1 illustrates one embodiment of the method of the present invention.

FIG. 1 is illustrative of one embodiment of a method for recovery lost/damaged compression constants in accordance with the teachings of the present invention. In this embodiment, certain information, such as the information which identifies the placement of the encoded data in the bitstream is known. However, at least one of the compression constants which are utilized to decode the encoded data is lost or damaged (lost/damaged). In one example in which the data is encoded using ADRC, the present method can be used to recover lost/damaged compression constants such as DR, MAX or MIN. Typically two of these constants, e.g., DR and MIN, are used to decode the encoded data, e.g., Q codes, received in the bitstream. In another embodiment, CEN and DR are used to decode the decoded data. CEN is a central value within the dynamic range. In one embodiment CEN may be set to MIN+DR/2.

Referring to FIG. 1, at step 105, encoded data of at least one neighboring block, encoded data of the block with the lost/damaged compression constant, and any previous recovered compression constants of the block and neighboring block are received as input. At step 110, the lost/damaged compression constant is estimated using the neighboring encoded data, encoded data of the block and any previous recovered compression constants of the block and the neighboring block.

A significant time and cost savings is achieved by using the encoded data of the block and the neighboring block as it is not necessary to go through one or more iterations of a costly decoding process before determining the lost/damaged compression constant.

Continuing with the present example which uses MIN and DR to decode the Q codes, if the MIN value is lost/damaged, the DR value and Q codes of the block and the DR, MIN and Q codes of the neighboring block are used to estimate the MIN value using encoded data.

MIN may be estimated as the value that minimizes an average difference between decoded values from the block and corresponding decoded values from at least one neighboring block. The average function can be a weighted average of neighboring values, for example, the values may be weighted relative to the location of the neighboring block with respect to the block of interest. In one embodiment, MIN may be estimated using a least squares estimation. For example, MIN may be determined as follows:

Non edge-matching ADRC:

$$MIN = \frac{2^{Q+Q'+1} \cdot N \cdot MIN' + 2^Q \cdot DR' \cdot \sum_{i=1}^{N}(2e'_i + 1) - 2^{Q'} \cdot DR \cdot \sum_{i=1}^{N}(2e_i + 1)}{2^{Q+Q'+1} \cdot N}$$

Edge-matching ADRC:

$$MIN = \frac{(2^Q - 1) \cdot (2^{Q'} - 1) \cdot N \cdot (2 \cdot MIN' + 1) + 2 \cdot (2^Q - 1) \cdot DR' \cdot \sum_{i=1}^{N} e'_i - 2 \cdot (2^{Q'} - 1) \cdot DR \cdot \sum_{i=1}^{N} e_i}{2 \cdot (2^Q - 1) \cdot (2^{Q'} - 1) \cdot N}$$

where N represents a number of neighboring encoded data to use, MIN' represents the MIN value of the neighboring block, DR and DR' respectively represents the DR value of the block and the neighboring block, Q represents a number of quantization bits used to encode the block, Q' represents a number of quantization bits used to encode the neighboring block, $e_i$ represents the encoded data (e.g., Qcodes) and $e'_i$ represents the encoded neighboring data, such as the encoded data, of the neighboring block.

If the DR value is lost/damaged, the MIN value and Q codes of the block and the DR, MIN and Q codes of the neighboring block are used to estimate DR.

In one embodiment, DR may be estimated using a least squares estimation. For example:
an integer formula for non edge-matching ADRC:

$$DR = \frac{2^{Q+1} \cdot (MIN' - MIN) \cdot \sum_{i=1}^{N}(2e_i + 1) + 2^{Q-Q'} \cdot DR' \cdot \sum_{i=1}^{N}(2e'_i + 1) \cdot (2e_i + 1)}{\sum_{i=1}^{N}(2e_i + 1)^2}$$

an integer formula for edge-matching ADRC:

$$DR = \frac{(2^Q - 1) \cdot (2^{Q'} - 1) \cdot (2 \cdot MIN' - 2 \cdot MIN + 1) \cdot \sum_{i=1}^{N} e_i + 2 \cdot (2^Q - 1) \cdot DR' \cdot \sum_{i=1}^{N}(e'_i \cdot e_i)}{2 \cdot (2^{Q'} - 1) \cdot \sum_{i=1}^{N}(e_i)^2}$$

where N represents a number of neighboring encoded data to use, MIN and MIN' respectively represent the MIN value of the block and the neighboring block, Q represents a number of quantization bits used to encode, Q' represents a number of quantization bits used to encode the neighboring block, $e_i$ and $e'_i$ respectively represent the encoded data of the block and the neighboring block and DR' represents the dynamic range of the neighboring block.

In another embodiment, an alternate recovery formula may be used. DR may be estimated as the value that makes the sum of decoded values of the block equal to the sum of the decoded values of the neighboring block. For example, DR is determined according to the following equation:

Non edge-matching ADRC:

$$DR = \frac{2^Q \cdot \sum_{i=1}^{N}\left[DR' \cdot (2 \cdot e'_i + 1) + 2^{Q'+1} \cdot (MIN' - MIN)\right]}{2^{Q'} \cdot \sum_{i=1}^{N}(2 \cdot e_i + 1)}$$

Edge-matching ADRC:

$$DR = \frac{(2^Q - 1) \cdot \sum_{i=1}^{N}\left[DR' \cdot e'_i + (2^{Q'} - 1) \cdot (MIN' - MIN)\right]}{(2^{Q'} - 1) \cdot \sum_{i=1}^{N} e_i}$$

where N represents a number of neighboring encoded data to use, MIN and MIN' respectively represent the MIN value of the block and the neighboring block, Q represents a number of quantization bits used to encode, Q' represents a number of quantization bits used to encode the neighboring block, $e_i$ and $e'_i$ respectively represent the encoded data of the block and the neighboring block and DR' represents the dynamic range of the neighboring block.

If CEN and DR are used to decode the Q codes, and the CEN value is lost/damaged, the DR value and Q codes of the block and the DR, CEN and Q codes of the neighboring block are used to estimate the CEN value using encoded data.

CEN may be estimated as the value that minimizes an average difference between decoded values from the block and corresponding decoded values from at least one neighboring block. In one embodiment, CEN may be estimated using a least squares estimation. For example, CEN may be determined as follows:

Non edge-matching ADRC:

$$CEN = \frac{2^{Q+Q'} \cdot N \cdot (2 \cdot CEN' + DR - DR') + 2^Q \cdot DR' \cdot \sum_{i=1}^{N}(2 \cdot e'_i + 1) - 2^{Q'} \cdot DR \cdot \sum_{i=1}^{N}(2 \cdot e_i + 1)}{2^{Q+Q'+1} \cdot N}$$

Edge-matching ADRC:

$$CEN = \frac{(2^Q - 1) \cdot (2^{Q'} - 1) \cdot N \cdot (2 \cdot CEN' + DR - DR' + 1) + 2 \cdot (2^Q - 1) \cdot DR' \cdot \sum_{i=1}^{N} e'_i - 2 \cdot (2^{Q'} - 1) \cdot DR \cdot \sum_{i=1}^{N} e_i}{2 \cdot (2^Q - 1) \cdot (2^{Q'} - 1) \cdot N}$$

where N represents a number of neighboring encoded data to use, CEN' represents the CEN value of the neighboring block, DR and DR' respectively represents the DR value of the block and the neighboring block, Q represents a number of quantization bits used to encode the block, Q' represents a number of quantization bits used to encode the neighboring block, $e_i$ represents the encoded data (e.g., Qcodes) and $e'_i$ represents the encoded neighboring data, such as the encoded data, of the neighboring block.

If the DR value is lost/damaged, the CEN value and Q codes of the block and the DR, CEN and Q codes of the neighboring block are used to estimate DR.

In one embodiment, DR may be estimated using a least squares estimation. For example:

an integer formula for non edge-matching ADRC:

$$DR = \frac{2^Q \cdot (2 \cdot CEN' - 2 \cdot CEN + DR - DR') \cdot \sum_{i=1}^{N}(2 \cdot e_i + 1) + 2^{Q-Q'} \cdot DR' \cdot \sum_{i=1}^{N}(2 \cdot e'_i + 1) \cdot (2 \cdot e_i + 1)}{\sum_{i=1}^{N}(2 \cdot e_i + 1)^2}$$

an integer formula for edge-matching ADRC:

$$DR = \frac{(2^Q - 1) \cdot (2^{Q'} - 1) \cdot (2 \cdot CEN' - 2 \cdot CEN + DR - DR' + 1) \cdot \sum_{i=1}^{N} e_i + 2 \cdot (2^Q - 1) \cdot DR' \cdot \sum_{i=1}^{N}(e'_i \cdot e_i)}{2 \cdot (2^{Q'} - 1) \cdot \sum_{i=1}^{N}(e_i)^2}$$

where N represents a number of neighboring encoded data to use, CEN and CEN' respectively represents the MIN value of the block and the neighboring block, Q represents a number of quantization bits used to encode, Q' represents a number of quantization bits used to encode the neighboring block, $e_i$ and $e'_i$ respectively represent the encoded data of the block and the neighboring block and DR' represents the dynamic range of the neighboring block.

In another embodiment, an alternate recovery formula may be used. DR may be estimated as the value that makes the sum of decoded values of the block equal to the sum of the decoded values of the neighboring block. For example, DR is determined according to the following equation:

Non edge-matching ADRC:

$$DR = \frac{2^Q \cdot \sum_{i=1}^{N}\left[DR' \cdot (2e'_i + 1) + 2^{Q'} \cdot (2 \cdot CEN' - 2 \cdot CEN + DR - DR')\right]}{2^{Q'} \cdot \sum_{i=1}^{N}(2e_i + 1)}$$

Edge-matching ADRC:

$$DR = \frac{(2^Q - 1) \cdot \sum_{i=1}^{N}\left[2 \cdot DR' \cdot e'_i + (2^{Q'} - 1) \cdot (2 \cdot CEN' - 2 \cdot CEN + DR - DR')\right]}{2 \cdot (2^{Q'} - 1) \cdot \sum_{i=1}^{N} e_i}$$

where N represents a number of neighboring encoded data to use, CEN and CEN' respectively represent the CEN value of the block and the neighboring block, Q represents a number of quantization bits used to encode, Q' represents a number of quantization bits used to encode the neighboring block, $e_i$ and $e'_i$ respectively represent the encoded data of the block and the neighboring block and DR' represents the dynamic range of the neighboring block.

Other embodiments are also contemplated. For example, if MIN and MAX are used as compression constants, and one of them is damaged, DR is estimated and the compression constant is computed from the estimated DR. Furthermore, if MAX and DR are used, processing similar to MIN and DR described herein is used. Furthermore, other constants specifically not identified herein may be used. It is contemplated that other constant levels may function similar to MIN and appropriate equations would be derived therefrom.

In an alternate embodiment, variables used to determine other compression constants are also used to determine other compression constants discussed herein. For example, for data encoded using ADRC, the Qbit and motion flag values utilize the following variables:

$$X = \sum_{i=1}^{N} e_i$$

$$Y = \sum_{i=1}^{N} e'_i$$

where $e_i$ and $e'_i$ respectively represent the encoded data of the block and the neighboring block. As a large percentage of the hardware is devoted to computing the above sums (because the sums may be taken over N usable neighboring relations), the complexity of MIN and DR estimation circuits may be greatly reduced by inputting X and Y values where applicable. Thus, in one embodiment, for example, using X and Y, MIN and DR may be determined as follows:

Non edge-matching ADRC:

$$MIN = \frac{2^{Q+Q'-1} \cdot N \cdot MIN' + 2^{Q-2} \cdot DR' \cdot (2 \cdot Y + N) - 2^{Q'-2} \cdot DR \cdot (2 \cdot X + N)}{2^{Q+Q'-1} \cdot N}$$

$$DR = \frac{2^Q \cdot [2^{Q'+1} \cdot N \cdot (MIN' - MIN) + DR' \cdot (2 \cdot Y + N)]}{2^{Q'} \cdot (2 \cdot X + N)}$$

Edge-matching ADRC:

$$MIN = \frac{(2^Q - 1) \cdot (2^{Q'} - 1) \cdot N \cdot (2 \cdot MIN' + 1) + 2 \cdot (2^Q - 1) \cdot DR' \cdot Y - 2 \cdot (2^{Q'} - 1) \cdot DR \cdot X}{2 \cdot (2^Q - 1) \cdot (2^{Q'} - 1) \cdot N}$$

$$DR = \frac{(2^Q - 1) \cdot [(2^{Q'} - 1) \cdot (MIN' - MIN) + DR' \cdot Y]}{(2^{Q'} - 1) \cdot X}$$

where N represents the number of neighboring data, Q and Q' respectively represent the Q bit number of the block and the neighboring block, MIN' represents the MIN value of the neighboring block, DR and DR' respectively represent the DR of the block and neighboring block.

In an alternate embodiment, using X and Y, CEN and DR may be determined as follows:

Non edge-matching ADRC:

$$CEN = \frac{2^{Q+Q'-2} \cdot N \cdot (2 \cdot CEN' + DR - DR') + 2^{Q-2} \cdot DR' \cdot (2 \cdot Y + N) - 2^{Q'-2} \cdot DR \cdot (2 \cdot X + N)}{2^{Q+Q'-1} \cdot N}$$

$$DR = \frac{2^Q \cdot [2^{Q'} \cdot N \cdot (2 \cdot CEN' - 2 \cdot CEN + DR - DR') + DR' \cdot (2 \cdot Y + N)]}{2^{Q'} \cdot (2 \cdot X + N)}$$

Edge-Matching ADRC:

$$CEN = \frac{2^Q - 1 \cdot (2^{Q'} - 1) \cdot N \cdot (2 \cdot CEN' + DR - DR' + 1) + 2 \cdot (2^Q - 1) \cdot DR' \cdot Y - 2 \cdot (2^Q - 1) \cdot DR \cdot X}{2 \cdot (2^Q - 1) \cdot (2^{Q'} - 1) \cdot N}$$

$$DR = \frac{(2^Q - 1) \cdot [(2^{Q'} - 1) \cdot (2 \cdot CEN' - 2 \cdot CEN + DR - DR') + 2 \cdot DR' \cdot Y]}{2 \cdot (2^{Q'} - 1) \cdot X}$$

In the present embodiments, the numerator may be clipped such that n=max(0,n).

The numerator and denominator of the above equations may be large (e.g. 24 bits), thus, a general purpose divider to accommodate a range of values would require much hardware. It has been determined that certain efficiencies can be realized without compromising on the effectiveness of the results. As the allowed ranges of the compression values (e.g. MIN and DR) are restricted to certain ranges (e.g. 0–255 for one implementation), only a low precision (e.g. 8 bit) is required. It has also been determined that leading zeros can be eliminated without changing the accuracy of the result and the least significant bit can be truncated with only a minor effect on the result.

Figure 2:
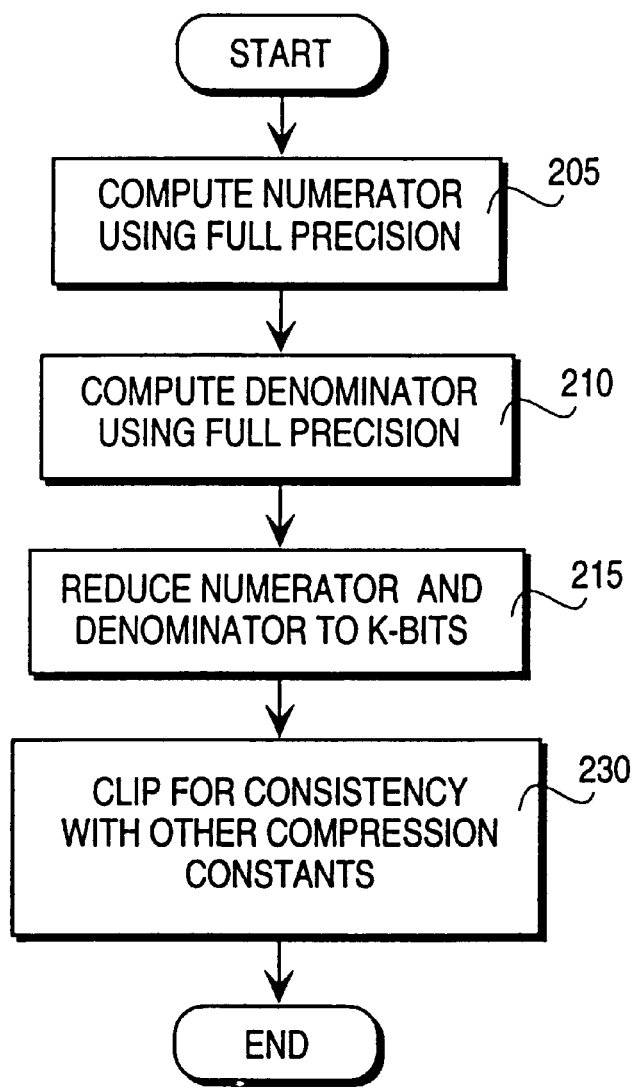
FIG. 2 illustrates an alternate embodiment of the method of the present invention.

Thus, an alternate embodiment is described with reference to FIG. 2. In this embodiment, the steps can be performed quickly in hardware logic. As noted above the equations require a division operation to be performed; therefore, a numerator and denominator of the quotient will be referred to in the following discussion.

At step 205, the numerator of one of the above formulae is computed using full precision. At step 210, the denominator is computed using full precision. At step 215, the numerator and denominator are reduced by shifting off the least significant bit until both are at least K-bits in length (i.e., until K-bits or less in length). In the present embodiment, the numerator and denominator are shifted the same number of bits. However, in alternate embodiments, the numerator and denominator maybe shifted a different number of bits. In such an embodiment, compensation would be made elsewhere for the bit-shift differential.

Thus, in the present embodiment, while ($n \geq 2^K$ or $d \geq 2^K$), then n/2 (shift off LSB)
d/2 (shift off LSB)

where n represents the value of the numerator and d represents the value of the denominator.

A value of K is selected such that integer division can be performed using cost efficient logic while maintaining an acceptable image quality. In one embodiment, K is selected such that the maximum error is not visually detectable, e.g., the maximum error is not greater than 3%. In the present embodiment in which an 8 bit encoding is used, K is selected to be 13.

At step 230, the value is clipped for consistency with the auxiliary information available, for example other available compression constants. In the present example, the value is clipped to satisfy the allowable range of values. For example, for 8 bit ADRC:

non edge-matching ADRC:

$MIN+DR \leq 254$ $CEN+DR/2 \leq 254'$ edge-matching ADRC:

$MIN+DR \leq 255$ $CEN+DR/2 \leq 255$

Figure 3A:
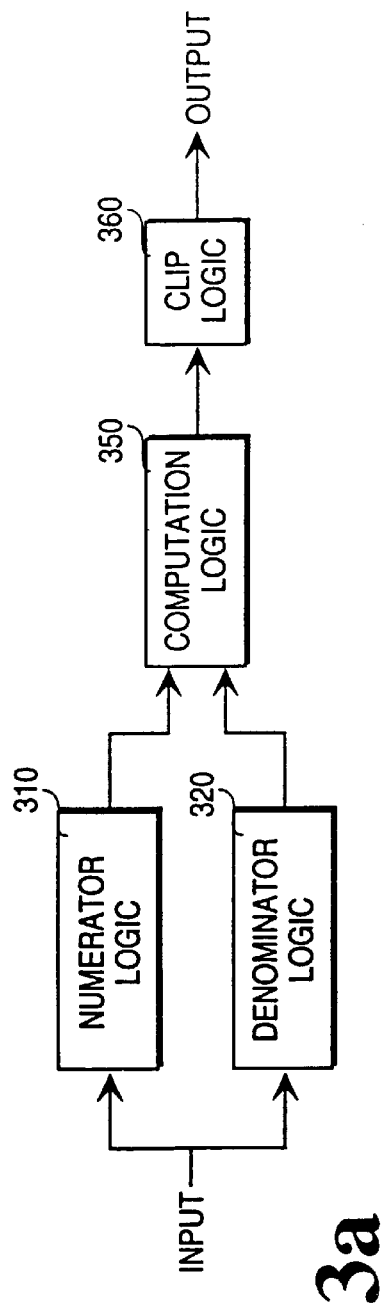
FIG. 3a illustrates one embodiment of the system of the present invention.
Figure 3B:
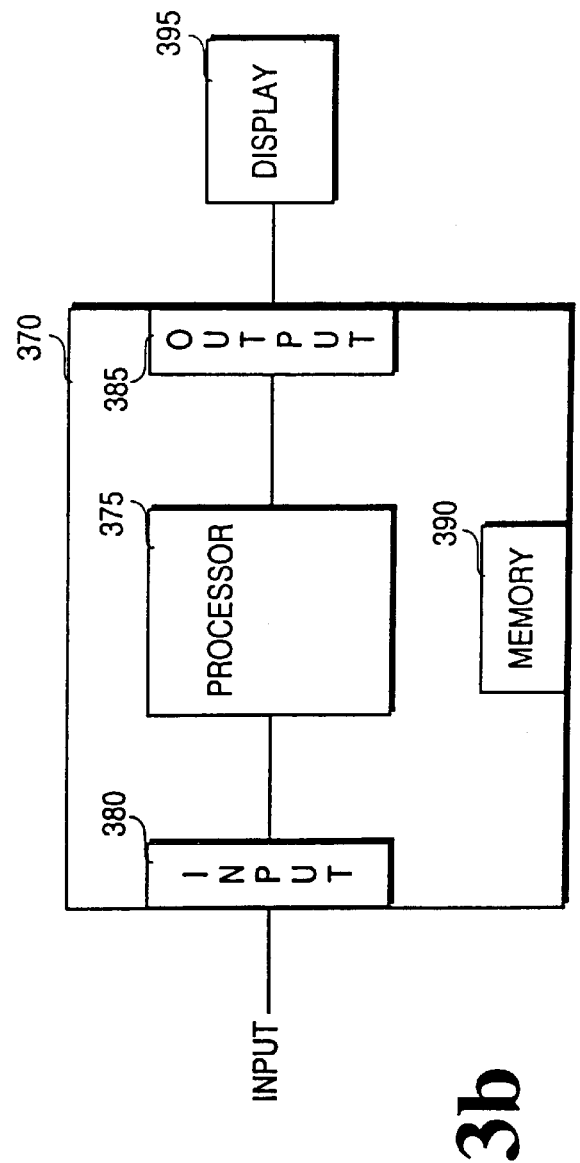
FIG. 3b illustrates another embodiment of the system of the present invention.

One embodiment of the system of the present invention is illustrated in FIG. 3a. FIG. 3a is a simplified functional block diagram of estimator circuitry that may be utilized to implement the processes described herein. For example, the circuitry may be implemented in specially configured logic, such as large scale integration (LSI) logic or programmable gate arrays. Alternately, as is illustrated in FIG. 3b, the circuitry may be implemented as code executed by a dedicated, specially configured or general purpose processor, which executes instructions stored in a memory or other storage device. Furthermore, the present invention may be implemented as a combination of the above.

Referring to FIG. 3a, numerator logic 310 determines the full precision value of the numerator portion of the computation performed to estimate a lost/damaged compression constant in the encoded domain. Denominator logic 320 similarly determines a full precision value of the denominator portion of the computation. In one embodiment, K-bit shift registers (not shown) shift out the least significant bits of the values generated by logic 310, 320 until the numerator and denominator are each K-bits in length. Alternately, the shift operation may be performed by computation logic 350. As described earlier, K is chosen, for example, empirically, such that the amount of logic/hardware required to perform subsequent operations is minimized for efficiency while maintaining an acceptable level of precision.

Computation logic 350 performs an integer division of the numerator and denominator. Clip logic 360 is optionally included to clip the output of computation logic 350 to be consistent with other available compression constants. Thus, using this structure, a fast, cost efficient circuit is provided for estimating lost/damaged compression constants.

The output of the circuit is preferably coupled to additional logic (not shown) which decodes using data including the recovered compression constant. In one embodiment in which the data is image data, the decoded data is used to drive a display device.

An alternate embodiment of the circuit for recovering lost/damaged compression constants is shown in FIG. 3b. The methods described herein can be implemented on a specially configured or general purpose processor system 370. Instructions are stored in the memory 390 and accessed by the processor 375 to perform many of the steps described herein. An input 380 receives the input bitstream and forwards the data to the processor 375. The output 385 outputs the data. In one embodiment, the output may consist of the decoded data, such as image data decoded once the compression constant is recovered, sufficient to drive an external device such as display 395. In another embodiment, the output 385 outputs the recovered compression constant. The recovered compression constant is then input to other circuitry (not shown) to generate the decoded data.

Although the present invention is discussed with respect to image data, the present invention may be used with any form of correlated data, including without limitation photographs or other two-dimensional static images, holograms, or other three-dimensional static images, video or other two-dimensional moving images, three-dimensional moving images, a monaural sound stream, or sound separated into a number of spatially related streams, such as stereo.

The invention has been described in conjunction with the preferred embodiment. It is evident that numerous alternatives, modifications, variations and uses will be apparent to those skilled in the art in light of the foregoing description.

What is claimed is:

1. A method for recovery of at least one lost/damaged compression constant for a block of encoded data, said method comprising estimating a compression constant of the block using encoded data of at least one neighboring block of data, a compression constant that represents a central data value for the at least one neighboring block, and other recoverable compression constants of the block.

2. The method as set forth in claim 1, wherein the encoded data is selected from the set comprising image data and sound data.

3. The method as set forth in claim 1, wherein the encoded data comprises image data and each block comprises compression constants selected from the group comprising MIN, CEN, DR and MAX, wherein MIN represents a minimum data value in the block, CEN represents a central value, DR represents a dynamic range of the block and MAX represents a maximum data value in the block.

4. The method as set forth in claim 1, wherein the compression constant is determined using a difference function between encoded data of the block of encoded data and the neighboring block of data.

5. The method as set forth in claim 1, wherein the compression constant is determined using a least squares estimation.

6. The method as set forth in claim 1, wherein the compression constant is determined as a value that makes a sum of decoded values of the block equal to a sum of decoded values of the neighboring block.

7. The method as set forth in claim 3, wherein estimating comprises determining MIN according to the to a formula selected from the group comprising:

$$MIN = \frac{2^{Q+Q'+1} \cdot N \cdot MIN' + 2^Q \cdot DR' \cdot \sum_{i=1}^{N}(2 \cdot e'_i + 1) - 2^{Q'} \cdot DR \cdot \sum_{i=1}^{N}(2 \cdot e_i + 1)}{2^{Q+Q'+1} \cdot N}; \text{ and}$$

$$MIN = \frac{(2^Q - 1) \cdot (2^{Q'} - 1) \cdot N \cdot (2 \cdot MIN' + 1) + 2 \cdot (2^Q - 1) \cdot DR' \cdot \sum_{i=1}^{N} e'_i - 2 \cdot (2^{Q'} - 1) \cdot DR \cdot \sum_{i=1}^{N} e_i}{2 \cdot (2^Q - 1) \cdot (2^{Q'} - 1) \cdot N}$$

where N represents a number of neighboring encoded data to use, MIN' represents the MIN value of the neighboring block, DR and DR' respectively represents the DR value of the block and the neighboring block, Q represents a number of quantization bits used to encode the block, Q' represents a number of quantization bits used to encode the neighboring block, $e_i$ represents the encoded data (e.g., Qcodes) and $e'_i$ represents the encoded neighboring data, such as the encoded data, of the neighboring block.

8. The method as set forth in claim 3, wherein estimating comprises determining DR according to a formula selected from the group comprising:

$$DR = \frac{2^Q \cdot (2 \cdot CEN' - 2 \cdot CEN + DR - DR') \cdot \sum_{i=1}^{N}(2 \cdot e_i + 1) + 2^{Q-Q'} \cdot DR' \cdot \sum_{i=1}^{N}(2 \cdot e'_i + 1) \cdot (2 \cdot e_i + 1)}{\sum_{i=1}^{N}(2 \cdot e_i + 1)^2},$$

$$DR = \frac{(2^Q - 1) \cdot (2^{Q'} - 1) \cdot (2 \cdot CEN' - 2 \cdot CEN + DR - DR' + 1) \cdot \sum_{i=1}^{N} e_i + 2 \cdot (2^Q - 1) \cdot DR' \cdot \sum_{i=1}^{N}(e'_i \cdot e_i)}{2 \cdot (2^{Q'} - 1) \cdot \sum_{i=1}^{N}(e_i)^2},$$

$$DR = \frac{2^Q \cdot \sum_{i=1}^{N}\left[DR' \cdot (2 \cdot e'_i + 1) + 2^{Q'} \cdot (2 \cdot CEN' - 2 \cdot CEN + DR - DR')\right]}{2^{Q'} \cdot \sum_{i=1}^{N}(2 \cdot e_i + 1)},$$

and $$DR = \frac{(2^Q - 1) \cdot \sum_{i=1}^{N}[2 \cdot DR' \cdot e'_i + (2^{Q'} - 1) \cdot (2 \cdot CEN' - 2 \cdot CEN + DR - DR')]}{2 \cdot (2^{Q'} - 1) \cdot \sum_{i=1}^{N} e_i}$$

where N represents a number of neighboring encoded data to use, MIN and MIN' respectively represent the MIN value of the block and the neighboring block, CEN and CEN' respectively represent the CEN value of the block and the neighboring block, Q represents a number of quantization bits used to encode, Q' represents a number of quantization bits used to encode the neighboring block, $e_i$ and $e'_i$ respectively represent the encoded data of the block and the neighboring block and DR' represents the dynamic range of the neighboring block.

9. The method as set forth in claim 3, wherein estimating comprises determining CEN according to a formula selected from the group comprising:

$$CEN = \frac{2^{Q+Q'} \cdot N \cdot (2 \cdot CEN' + DR - DR') + 2^Q \cdot DR' \cdot \sum_{i=1}^{N}(2 \cdot e'_i + 1) - 2^{Q'} \cdot DR \cdot \sum_{i=1}^{N}(2 \cdot e_i + 1)}{2^{Q+Q'+1} \cdot N}$$

and $$CEN = \frac{(2^Q - 1) \cdot (2^{Q'} - 1) \cdot N \cdot (2 \cdot CEN' + DR - DR' + 1) + 2 \cdot (2^Q - 1) \cdot DR' \cdot \sum_{i=1}^{N} e'_i - 2 \cdot (2^{Q'} - 1) \cdot DR \cdot \sum_{i=1}^{N} e_i}{2 \cdot (2^Q - 1) \cdot (2^{Q'} - 1) \cdot N}$$

where N represents a number of neighboring encoded data to use, CEN' represents the CEN value of the neighboring block, DR and DR' respectively represents the DR value of the block and the neighboring block, Q represents a number of quantization bits used to encode the block, Q' represents a number of quantization bits used to encode the neighboring block, $e_i$ represents the encoded data (e.g., Qcodes) and $e'_i$ represents the encoded neighboring data of the neighboring block.

10. The method as set forth in claim 1, wherein integer computations are used to recover the lost/damaged compression constant.

11. The method as set forth in claim 3, wherein MIN is estimated as the value that minimizes an average difference between a decoded value of the block and a decoded value of the neighboring block.

12. The method as set forth in claim 3, wherein DR is estimated as the value that makes a sum of decoded values of the block equal to the sum of decoded values of the neighboring block.

13. The method as set forth in claim 3, where CEN is estimated as the value that minimizes an average difference between a decoded value of the block and a decoded value of the neighboring block.

14. The method as set forth in claim 1, wherein estimating is performed in accordance with an equation computed by forming the numerator and denominator of the equation in full precision, shifting off a least significant bit from the numerator and the denominator until the numerator and the denominator are less than $2^K$, and performing K-bit division, where K is a constant.

15. A system for recovering at least one lost/damaged compression constant for a block of encoded data comprising an estimator configured to receive as input encoded data of at least one neighboring block of data, a compression constant that represents a central data value for the at least one neighboring block, and other recoverable compression constants of the block and estimate a compression constant using the input.

16. The system as set forth in claim 15, wherein the estimator is chosen from a group comprising an estimation logic circuit, a processor, and a combination of estimation logic and a processor.

17. The system as set forth in claim 15, wherein the encoded data is selected from the set comprising image data and sound data.

18. The system as set forth in claim 15, wherein the encoded data comprises image data and each block comprises compression constants selected from the group comprising MIN, CEN, DR and MAX compression constants, wherein MIN represents a minimum data value in the block, CEN represents a central value, DR represents a dynamic range of the block and MAX represents a maximum data value in the block.

19. The system as set forth in claim 15, wherein the compression constant is determined using a difference function between encoded data of the block of encoded data and the neighboring block of data.

20. The system as set forth in claim 15, wherein the compression constant is determined using a least squares estimation.

21. The system as set forth in claim 15, wherein the compression constant is determined as a value that makes a sum of decoded values of the block equal to a sum of decoded values of the neighboring block.

22. The system as set forth in claim 18, wherein MIN is estimated according to a formula selected from the group comprising:

$$MIN = \frac{2^{Q+Q'+1} \cdot N \cdot MIN' + 2^Q \cdot DR' \cdot \sum_{i=1}^{N}(2 \cdot e'_i + 1) - 2^{Q'} \cdot DR \cdot \sum_{i=1}^{N}(2 \cdot e_i + 1)}{2^{Q+Q'+1} \cdot N}, \text{ and}$$

$$MIN = \frac{(2^Q - 1) \cdot (2^{Q'} - 1) \cdot N \cdot (2 \cdot MIN' + 1) + 2 \cdot (2^Q - 1) \cdot DR' \cdot \sum_{i=1}^{N} e'_i - 2 \cdot (2^{Q'} - 1) \cdot DR \cdot \sum_{i=1}^{N} e_i}{2 \cdot (2^Q - 1) \cdot (2^{Q'} - 1) \cdot N}$$

where N represents a number of neighboring encoded data to use, MIN' represents the MIN value of the neighboring block, DR and DR' respectively represents the DR value of the block and the neighboring block, Q represents a number of quantization bits used to encode the block, Q' represents a number of quantization bits used to encode the neighboring block, $e_i$ represents the encoded data (e.g., Qcodes) and $e'_i$ represents the encoded neighboring data, such as the encoded data, of the neighboring block.

23. The system as set forth in claim 18, wherein DR is estimated according a formula selected from the group comprising:

$$DR = \frac{2^Q \cdot (2 \cdot CEN' - 2 \cdot CEN + DR - DR') \cdot \sum_{i=1}^{N}(2 \cdot e_i + 1) + 2^{Q-Q'} \cdot DR' \cdot \sum_{i=1}^{N}(2 \cdot e_i' + 1) \cdot (2 \cdot e_i + 1)}{\sum_{i=1}^{N}(2 \cdot e_i + 1)^2},$$

$$DR = \frac{(2^Q - 1) \cdot (2^{Q'} - 1) \cdot (2 \cdot CEN' - 2 \cdot CEN + DR - DR' + 1) \cdot \sum_{i=1}^{N} e_i + 2 \cdot (2^Q - 1) \cdot DR' \cdot \sum_{i=1}^{N}(e_i' \cdot e_i)}{2 \cdot (2^{Q'} - 1) \cdot \sum_{i=1}^{N}(e_i)^2},$$

$$DR = \frac{2^Q \cdot \sum_{i=1}^{N}[DR' \cdot (2 \cdot e_i' + 1) + 2^{Q'} \cdot (2 \cdot CEN' - 2 \cdot CEN + DR - DR')]}{2^{Q'} \cdot \sum_{i=1}^{N}(2 \cdot e_i + 1)}, \text{ and}$$

$$DR = \frac{(2^Q - 1) \cdot \sum_{i=1}^{N}[2 \cdot DR' \cdot e_i' + (2^{Q'} - 1) \cdot (2 \cdot CEN' - 2 \cdot CEN + DR - DR')]}{2 \cdot (2^{Q'} - 1) \cdot \sum_{i=1}^{N} e_i}$$

where N represents a number of neighboring encoded data to use, MIN and MIN' respectively represent the MIN value of the block and the neighboring block, CEN and CEN' respectively represent the CEN value of the block and the neighboring block, Q represents a number of quantization bits used to encode, Q' represents a number of quantization bits used to encode the neighboring block, $e_i$ and $e_i'$ respectively represent the encoded data of the block and the neighboring block and DR' represents the dynamic range of the neighboring block.

24. The system as set forth in claim 18, wherein CEN is estimated according to a formula selected from the group comprising:

$$CEN = \frac{2^{Q+Q'} \cdot N \cdot (2 \cdot CEN' + DR - DR') + 2^Q \cdot DR' \cdot \sum_{i=1}^{N}(2 \cdot e_i' + 1) - 2^{Q'} \cdot DR \cdot \sum_{i=1}^{N}(2 \cdot e_i + 1)}{2^{Q+Q'+1} \cdot N}$$

and $$CEN = \frac{(2^Q - 1) \cdot (2^{Q'} - 1) \cdot N \cdot (2 \cdot CEN' + DR - DR' + 1) + 2 \cdot (2^Q - 1) \cdot DR' \cdot \sum_{i=1}^{N} e_i' - 2 \cdot (2^{Q'} - 1) \cdot DR \cdot \sum_{i=1}^{N} e_i}{2 \cdot (2^Q - 1) \cdot (2^{Q'} - 1) \cdot N}$$

where N represents a number of neighboring encoded data to use, CEN' represents the CEN value of the neighboring block, DR and DR' respectively represents the DR value of the block and the neighboring block, Q represents a number of quantization bits used to encode the block, Q' represents a number of quantization bits used to encode the neighboring block, $e_i$ represents the encoded data (e.g., Qcodes) and $e_i'$ represents the encoded neighboring data of the neighboring block.

25. The system as set forth in claim 15, wherein integer computations are used to recover the lost/damaged compression constant.

26. The system as set forth in claim 18, wherein MIN is estimated as the value that minimizes an average difference between a decoded value of the block and a decoded value of a neighboring block.

27. The system as set forth in claim 18, wherein DR is estimated as the value that makes a sum of decoded values of the block equal to a sum of decoded values of the neighboring block.

28. The system as set forth in claim 18, wherein CEN is estimated as the value that minimizes an average difference between a decoded value of the block and a decoded value of a neighboring block.

29. The system as set forth in claim 15, wherein the estimation logic comprises:
   full precision registers configured to store a numerator and denominator of an equation used to estimate;
   shift logic configured to shift off the least significant bit until the numerator and the denominator are less than $2^K$; and
   division logic configured to perform K-bit division, where K is a constant.

30. A computer readable medium containing executable instructions, which, when executed in a processing system, causes the system to recover at least one lost/damaged compression constant of a block of encoded data, comprising estimating a compression constant of the block using encoded data of at least one neighboring block of data, a compression constant that represents a central data value for the at least one neighboring block, and other recoverable compression constants of the block.

31. The computer readable medium as set forth in claim 30, wherein the encoded data is selected from the set comprising image data and sound data.

32. The computer readable medium as set forth in claim 30, wherein the encoded data comprises compression constants selected from the group comprising MIN, CEN, DR and MAX, wherein MIN represents a minimum data value in the block, CEN represents a central value, DR represents a dynamic range of the block and MAX represents a maximum data value in the block.

33. The computer readable medium as set forth in claim 30, wherein the compression constant is determined using a difference function between encoded data of the block of encoded data and the neighboring block of data.

34. The computer readable medium as set forth in claim 30, wherein the compression constant is determined using a least squares estimation.

35. The computer readable medium as set forth in claim 30, wherein the compression constant is determined as a value that makes a sum of decoded values of the block equal to a sum of decoded values of the neighboring block.

36. The computer readable medium as set forth in claim 32, wherein estimating comprises determining MIN according to a formula selected from the group comprising:

$$MIN = \frac{2^{Q+Q'+1} \cdot N \cdot MIN' + 2^Q \cdot DR' \cdot \sum_{i=1}^{N}(2 \cdot e'_i + 1) - 2^{Q'} \cdot DR \cdot \sum_{i=1}^{N}(2 \cdot e_i + 1)}{2^{Q+Q'+1} \cdot N},$$

$$MIN = \frac{(2^Q - 1) \cdot (2^{Q'} - 1) \cdot N \cdot (2MIN' + 1) + 2 \cdot (2^Q - 1) \cdot DR' \cdot \sum_{i=1}^{N} e'_i - 2 \cdot (2^{Q'} - 1) \cdot DR \cdot \sum_{i=1}^{N} e_i}{2 \cdot (2^Q - 1) \cdot (2^{Q'} - 1) \cdot N}$$

where N represents a number of neighboring encoded data to use, MIN' represents the MIN value of the neighboring block, DR and DR' respectively represents the DR value of the block and the neighboring block, Q represents a number of quantization bits used to encode the block, Q' represents a number of quantization bits used to encode the neighboring block, $e_i$ represents the encoded data (e.g., Qcodes) and $e'_i$ represents the encoded neighboring data, such as the encoded data, of the neighboring block.

37. The computer readable medium as set forth in claim 32, wherein estimating comprises determining DR according to a formula selected from the group comprising:

where N represents a number of neighboring encoded data to use, MIN and MIN' respectively represent the MIN value of the block and the neighboring block, CEN and CEN' respectively represent the CEN value of the block and the neighboring block, Q represents a number of quantization bits used to encode, Q' represents a number of quantization bits used to encode the neighboring block, $e_i$ and $e'_i$ respectively represent the encoded data of the block and the neighboring block and DR' represents the dynamic range of the neighboring block.

38. The computer readable medium as set forth in claim 32, wherein CEN is estimated according to a formula selected from the group comprising:

$$DR = \frac{2^Q \cdot (2 \cdot CEN' - 2 \cdot CEN + DR - DR') \cdot \sum_{i=1}^{N}(2 \cdot e_i + 1) + 2^{Q-Q'} \cdot DR' \cdot \sum_{i=1}^{N}(2 \cdot e'_i + 1) \cdot (2 \cdot e_i + 1)}{\sum_{i=1}^{N}(2 \cdot e_i + 1)^2},$$

$$DR = \frac{(2^Q - 1) \cdot (2^{Q'} - 1) \cdot (2 \cdot CEN' - 2 \cdot CEN + DR - DR' + 1) \cdot \sum_{i=1}^{N} e_i + 2 \cdot (2^Q - 1) \cdot DR' \cdot \sum_{i=1}^{N}(e'_i \cdot e_i)}{2 \cdot (2^{Q'} - 1) \cdot \sum_{i=1}^{N}(e_i)^2},$$

$$DR = \frac{2^Q \cdot \sum_{i=1}^{N}[DR' \cdot (2 \cdot e'_i + 1) + 2^{Q'} \cdot (2 \cdot CEN' - 2 \cdot CEN + DR - DR')]}{2^{Q'} \cdot \sum_{i=1}^{N}(2 \cdot e_i + 1)}, \text{ and}$$

$$DR = \frac{(2^Q - 1) \cdot \sum_{i=1}^{N}[2 \cdot DR' \cdot e'_i + (2^{Q'} - 1) \cdot (2 \cdot CEN' - 2 \cdot CEN + DR - DR')]}{2 \cdot (2^{Q'} - 1) \cdot \sum_{i=1}^{N} e_i}$$

$$CEN = \frac{2^{Q+Q'} \cdot N \cdot (2 \cdot CEN' + DR - DR') + 2^Q \cdot DR' \cdot \sum_{i=1}^{N}(2 \cdot e'_i + 1) - 2^{Q'} \cdot DR \cdot \sum_{i=1}^{N}(2 \cdot e_i + 1)}{2^{Q+Q'+1} \cdot N}$$

and $$CEN = \frac{(2^Q - 1) \cdot (2^{Q'} - 1) \cdot N \cdot (2 \cdot CEN' + DR - DR' + 1) + 2 \cdot (2^Q - 1) \cdot DR' \cdot \sum_{i=1}^{N} e'_i - 2 \cdot (2^{Q'} - 1) \cdot DR \cdot \sum_{i=1}^{N} e_i}{2 \cdot (2^Q - 1) \cdot (2^{Q'} - 1) \cdot N}$$

where N represents a number of neighboring encoded data to use, CEN' represents the CEN value of the neighboring block, DR and DR' respectively represents the DR value of the block and the neighboring block, Q represents a number of quantization bits used to encode the block, Q' represents a number of quantization bits used to encode the neighboring block, $e_i$ represents the encoded data (e.g., Qcodes) and $e'_i$ represents the encoded neighboring data of the neighboring block.

39. The computer readable medium as set forth in claim 32, wherein MIN is estimated as the value that minimizes an average difference between a decoded value of the block and a decoded value of the neighboring block.

40. The computer readable medium as set forth in claim 32, wherein DR is estimated as the value that makes a sum of decoded values of the block equal to a sum of decoded values of the neighboring block.

41. The computer readable medium as set forth in claim 32, wherein CEN is estimated as the value that minimizes an average difference between a decoded value of the block and a decoded value of the neighboring block.

42. The computer readable medium as set forth in claim 30, wherein integer computations are used to recover the lost/damaged compression constants.

43. The computer readable medium as set forth in claim 30, wherein the equation is computed by forming the numerator and denominator of the equation in full precision registers, shifting off the least significant bit until the numerator and the denominator are less than $2^K$, and performing K-bit division, where K is a constant.

44. An apparatus for recovering at least one lost/damaged compression constant for a block of encoded data comprising: means for receiving the block of encoded data; and means for estimating a compression constant of the block using encoded data of at least one neighboring block of data, a compression constant that represents a central data value for the at least one neighboring block, and other recoverable compression constants of the block.

45. The apparatus as set forth in claim 44, wherein the encoded data comprises image data and each block comprises MIN, CEN, DR and MAX compression constants selected from the group compressions, wherein MIN represents a minimum data value in the block, CEN represents a central value DR represents a dynamic range of the block and MAX represents a maximum data value in the block.

46. The apparatus as set forth in claim 44, wherein the equation is computed by forming the numerator and denominator of the equation in full precision, shifting off the least significant bit until the numerator and the denominator are less than $2^K$, and performing K-bit division, where K is a constant.

* * * * *